(12) United States Patent
Jain

(10) Patent No.: US 7,602,731 B2
(45) Date of Patent: *Oct. 13, 2009

(54) SYSTEM AND METHOD FOR INTEGRATED HEADER, STATE, RATE AND CONTENT ANOMALY PREVENTION WITH POLICY ENFORCEMENT

(75) Inventor: Hemant Kumar Jain, Los Gatos, CA (US)

(73) Assignee: IntruGuard Devices, Inc., Sunnyvale, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/021,637

(22) Filed: Dec. 22, 2004

(65) Prior Publication Data
US 2006/0133377 A1    Jun. 22, 2006

(51) Int. Cl.
*H04L 12/26* (2006.01)
*H04L 9/32* (2006.01)

(52) U.S. Cl. .................. 370/252; 713/168; 370/389; 370/428; 726/22; 726/26

(58) Field of Classification Search ............ 370/395.32, 370/395.4, 395.42, 241, 244, 252, 253, 245, 370/389, 428, 401, 469, 395.72, 232; 726/22, 726/26; 713/173, 122, 168, 188, 151, 150, 713/189, 194

See application file for complete search history.

(56) References Cited

U.S. PATENT DOCUMENTS

| | | | |
|---|---|---|---|
| 6,711,127 B1 * | 3/2004 | Gorman et al. | 370/230 |
| 6,904,057 B2 * | 6/2005 | Sarkinen et al. | 370/469 |
| 6,928,549 B2 * | 8/2005 | Brock et al. | 713/194 |
| 6,944,168 B2 * | 9/2005 | Paatela et al. | 370/401 |
| 6,944,678 B2 * | 9/2005 | Lu et al. | 709/245 |
| 7,006,505 B1 * | 2/2006 | Bleszynski et al. | 370/395.72 |
| 7,058,974 B1 * | 6/2006 | Maher et al. | 726/13 |
| 7,082,117 B2 * | 7/2006 | Billhartz | 370/338 |
| 7,150,044 B2 * | 12/2006 | Hoefelmeyer et al. | 726/23 |
| 7,177,930 B1 * | 2/2007 | LoPresti | 709/224 |
| 7,233,597 B2 * | 6/2007 | Kumar et al. | 370/401 |

(Continued)

FOREIGN PATENT DOCUMENTS

EP        0493892 A2 *  7/1992

OTHER PUBLICATIONS

A multi-agent based system for intrusion detection; Hegazy, I.M.; Al-Arif, T.; Fayed, Z.T.; Faheem, H.M.; Potentials, IEEE vol. 22, Issue 4, Oct.-Nov. 2003 pp. 28-31.*

(Continued)

*Primary Examiner*—Salman Ahmed
(74) *Attorney, Agent, or Firm*—Lumen Patent Firm

(57) ABSTRACT

The present invention provides an integrated prevention of header, state, rate and content anomalies along with network policy enforcement. A hardware based apparatus classifies layers 2, 3, 4 and 7 network data and maintains rate-thresholds through continuous and adaptive learning. In the process of classifying the packets, the apparatus can determine header and state anomalies and drop packets containing those anomalies. Accurate detection and prevention of layer 7 content anomalies is achieved using fragment assembly, TCP reorder and retransmission removal components, which also identify anomalies in those areas. Content inspection is achieved at high speed through a Content Inspection Engine. The apparatus integrates advantageous solutions to prevent anomalous packets and enables a policy based packet filter.

15 Claims, 4 Drawing Sheets

U.S. PATENT DOCUMENTS

| | | | |
|---|---|---|---|
| 7,234,168 B2* | 6/2007 | Gupta et al. | 726/25 |
| 7,305,708 B2* | 12/2007 | Norton et al. | 726/23 |
| 7,308,715 B2* | 12/2007 | Gupta et al. | 726/23 |
| 7,386,733 B2* | 6/2008 | Yoon et al. | 713/189 |
| 7,409,714 B2* | 8/2008 | Gupta et al. | 726/23 |
| 7,411,957 B2* | 8/2008 | Stacy et al. | 370/392 |
| 7,424,744 B1* | 9/2008 | Wu et al. | 726/23 |
| 7,426,634 B2* | 9/2008 | Jain | 713/151 |
| 2002/0194469 A1* | 12/2002 | Dominique et al. | 713/150 |
| 2003/0004688 A1* | 1/2003 | Gupta et al. | 702/188 |
| 2003/0004689 A1* | 1/2003 | Gupta et al. | 702/188 |
| 2003/0009699 A1* | 1/2003 | Gupta et al. | 713/201 |
| 2003/0014662 A1* | 1/2003 | Gupta et al. | 713/200 |
| 2003/0041266 A1 | 2/2003 | Ke et al. | 713/201 |
| 2003/0097557 A1 | 5/2003 | Tarquini et al. | 713/153 |
| 2003/0105881 A1* | 6/2003 | Symons et al. | 709/249 |
| 2003/0123447 A1 | 7/2003 | Smith | 370/394 |
| 2003/0123452 A1 | 7/2003 | Cox et al. | 370/395.43 |
| 2003/0149887 A1* | 8/2003 | Yadav | 713/200 |
| 2003/0204632 A1 | 10/2003 | Willebeek-LeMair et al. | 709/249 |
| 2003/0221013 A1* | 11/2003 | Lockwood et al. | 709/231 |
| 2004/0008681 A1* | 1/2004 | Govindarajan et al. | 370/394 |
| 2004/0114519 A1* | 6/2004 | MacIsaac | 370/232 |
| 2005/0044406 A1* | 2/2005 | Stute | 713/201 |
| 2005/0060557 A1* | 3/2005 | Lin | 713/188 |
| 2005/0086500 A1* | 4/2005 | Albornoz | 713/188 |
| 2005/0111460 A1* | 5/2005 | Sahita | 370/395.3 |
| 2006/0023709 A1* | 2/2006 | Hall et al. | 370/389 |
| 2006/0117386 A1* | 6/2006 | Gupta et al. | 726/23 |

OTHER PUBLICATIONS

Architecture for a hardware-based, TCP/IP content-processing system; Schuehler, D.V.; Moscola, J.; Lockwood, J.W.; Micro, IEEE vol. 24, Issue 1, Jan.-Feb. 2004 pp. 62-69.*

TCP-Stream reassembly and state tracking in hardware; Necker, M.; Contis, D.; Schimmel, D.; Field-Programmable Custom Computing Machines, 2002. Proceedings. 10th Annual IEEE Symposium on Apr. 22-24, 2002 pp. 286-287.*

Architecture for a hardware based, TCP/IP content scanning system [intrusion detection system applications]; Schuehler, D.V.; Moscola, J.; Lockwood, J.; High Performance Interconnects, 2003. Proceedings. 11th Symposium on Aug. 20-22, 2003 pp. 89-94.* http://www.idt.com/docs/75K6213452134_DS_80635.pdf 4.5M and 9M Network Search Engine (NSE) with QDR™ Interface.

G. Iannaccone, S. Jaiswal and C. Diot, "Packet Reordering Inside the Sprint Backbone," Tech. Report, TR01-ATL-062917, Sprint ATL, Jun. 2001.

E. Blanton and M. Allman, "On Making TCP More Robust to Packet Reordering", ACM Computer Comm. Review, 32(1), Jan. 2002, pp. 20-30.

M. Laor and L. Gendel, "The Effect of Packet Recordering in a Backbone Link on Application Throughput," IEEE Network, Sep./Oct. 2002, pp. 28-36.

Girish P. Chandranmenon et al., "Reconsidering Fragmentation and Reassembly," Aug. 1, 1997, Washington University in St. Louis, pp. 1-23.

T. Banka, A. A. Bare and A. P. Jayasumana, "Metrics for Degree of Reordering in Packet Sequences," Proc. 27th IEEE Conference on Local Computer Networks, Nov. 2002, pp. 333-342.

J. Bellardo and S. Savage, "Measuring Packet Reordering," Proc. IMW'02, Nov. 2002, pp. 97-105.

S. Jaiswal, G. Iannaccone, C. Diot, J. Kurose and D. Towsley, "Measurement and Classification of Out-of-sequence Packets in Tier-1 IP Backbone," Proc. IEEE INFOCOM, Mar. 2003, pp. 1199-1209.

Chris Clark, Wenke Lee, David Schimmel, Didier Contis, Mohamed Konè and Ashley Thomas, "A Hardware Platform for Network Intrusion Detection and Prevention", Workshop on Network Processors & Applications—NP3, Feb. 14-15, 2004, Madrid, Spain.

Colleen Shannon, David Moore, k claffy, "Characteristics of Fragmented IP Traffic on Internet Links", *PAM2001—A workshop on Passive and Active Measurements, RIPE NCC*, (Amsterdam, Netherlands), 2001.

Thomas H. Ptacek; Timothy N. Newsham, "Insertion Evasion and Denial of Service Eluding Network Intrusion Detection", Secure Networks, Jan. 1998.

David V. Schuehler John Lockwood, "TCP-Splitter A TCPIP Flow Monitor in Reconfigurable Hardware", IEEE Micro, Jan./Feb. 2003.

Marc Necker, Didier Contis, David Schimmel, "TCP-Stream Reassembly and State Tracking in Hardware", Proceedings of the 10 th Annual IEEE Symposium on Field-Programmable Custom Computing Machines (FCCM'02).

David V. Schuehler, James Moscola, John Lockwood, "Architecture for a Hardware Based, TCP/IP Content Scanning System", Proceedings of Hot Interconnects 11 (HotI-11), Stanford, CA, Aug. 20-22, 2003, pp. 89-94.

J. Postel, J. Reynolds, "Telnet Protocol Specifications", RFC 854, May 1983.

J. Postel, J. Reynolds, "File Transfer Protocol (FTP)", RFC 959, May 1985.

P. Mockapetris, "Domain Names—Implementation and Specification", RFC 1035, Nov. 1987.

Sun Microsystems, "RPC: Remote Procedure Call Protocol Specification Version 2", RFC 1057, Jun. 1988.

J. Myers, M. Rose, "Post Office Protocol—Version 3", RFC 1939, May 1996.

R. Fielding, et. al, "Hypertext Transfer Protocol—HTTP/1.1", RFC 2616, Jun. 1999.

J. Klensin, "Simple Mail Transfer Protocol", RFC 2821, Apr. 2001.

David D. Clark, "IP Datagram Reassembly Algorithms", RFC 815, Jul. 1982.

http://www.ccsi.cs.sunysb.edu/elibrary/linux/network/iprecv4.pdf Internet pages, "IP Reassembly", downloaded on Oct. 19, 2004.

Adam Dunkels, "Minimal TCP/IP implementation with proxy support", SICS Tchnical Report T2001:20, ISSN 1100-3154.

David Watson, Matthew Smart, G. Robert Malan, "Protocol Scrubbing: Network Security Through Transparent Flow Modification", IEEE/ACM Transactions on Networking, vol. 12, No. 2, Apr. 2004.

Matthew V. Mahoney et al., "PHAD: Packet Header Anomaly Detection for Identifying Hostile Network Traffic," Florida Institute of Technology Technical Report CS-2001-04, pp. 1-17.

Sun Microsystems, Inc., "RPC: Remote Procedure Call" RFC 1050, Apr. 1988.

http://www.syngress.com/book_catalog/244_snort/sample.pdf, "Preprocessors", Internet pages downloaded on Oct. 19, 2004.

* cited by examiner

SYSTEM AND METHOD FOR INTEGRATED HEADER, STATE, RATE AND CONTENT ANOMALY PREVENTION WITH POLICY ENFORCEMENT

CROSS-REFERENCE TO RELATED APPLICATIONS

The present invention relates to U.S. Patent Application No. 10/759,799, filed Jan. 15, 2004, now U.S. Pat. No. 7,426,634, entitled "METHOD AND APPARATUS FOR RATE BASED DENIAL OF SERVICE ATTACK DETECTION AND PREVENTION" and U.S. patent application No. 10/984,244, filed Nov. 8, 2004, now U.S. Pat. No. 7,356,663, entitled "LAYERED MEMORY ARCHITECTURE FOR DETERMINISTIC FINITE AUTOMATON BASED STRING MATCHING USEFUL IN NETWORK INTRUSION DETECTION AND PREVENTION SYSTEMS AND APPARATUSES," which are incorporated herein by reference.

FIELD OF THE INVENTION

The present invention relates generally to intrusion prevention and more particular to an integrated system and methods for the prevention of network header, state, rate, and content anomalies with policy enforcement.

DESCRIPTION OF THE BACKGROUND ART

Intrusion prevention appliances have been widely available in the last few years. Published U.S. patent application Nos. 20030004688, 20030004689, 20030009699, 20030014662, 20030204632, 20030123452, 20030123447, 20030097557, and 20030041266 disclose systems, methods and techniques that primarily focused on content, header and state anomaly based intrusion prevention with little or no emphasis on adaptive rate anomalies. These prior systems find rate anomalies using either a profile based approach or fixed thresholds.

As one skilled in the art knows, internet attacks have been growing in complexity and have been more wide-spread due to a variety of readily available attack toolkits. To protect critical resources, a new intrusion prevention method and system is therefore necessary to thwart attacks on these fronts at line-speeds available today. The present invention addresses this need.

SUMMARY OF THE INVENTION

The present invention fulfills the aforementioned need and desire for a new intrusion prevention system, method and apparatus with a single appliance that is capable of protecting critical servers and networks from protocol header, state, rate and content anomalies while enforcing network policies.

While it is impossible to predict the behavior of all types of future attacks, current trends in attacks lead to certain known categories of attacks, viz. pre-attack probes, header anomalies, state anomalies, rate anomalies and content anomalies. Some of these known attacks can be prevented using policy lookup. Policies such as denying protocols, ports, IP-address ranges can in fact deny several types of known attacks.

The inventive system disclosed herein provides copper and optical connectivity. A Packet Interface block interfaces with external network through a PHY and a MAC device and buffers packets until a decision has been made about them. A Classifier interfaces with Packet interface to classifier. The Rate Anomaly Meters receive classifier output and maintain the instantaneous packet-rates and compare against the thresholds set adaptively and continuously by the controlling host.

If the specific type of packets exceeds the rate threshold, packets of that type or belonging to that group are discarded for a certain time period. The anomaly engines drop packets that have header or state anomalies in different layers of protocol.

A fragment reassembly engine reassembles any fragments according to processes well-known in the art. Assembled or unfragmented packets are then sent to an engine that removes any reordering issues or retransmission anomalies for TCP packets.

Ordered TCP as well as non-TCP packets are then sent to relevant protocol normalization engines. The derived layers 2, 3, 4 and 7 header-parameters and state information are then used by the Multi-rule search engine to find a rule-set that matches the incoming packet.

A rule-matching engine drives the content inspection engine to validate if contents of the packet match any of the anomalous signatures. A Stateful sub-rule traversal engine then validates if further contents of the packet meet sub-signatures of the rule.

If a rule match is found, it is added to the event queue corresponding to the packet. A packet may match multiple rules.

After all the rules matches have been performed, a decision multiplexer picks the highest priority rule match and informs the MAC interface whether to let the packet through or to drop the packet. Allowed packets are then sent out.

An object of the present invention is to provide a high-rate hardware based integrated system and method of preventing network packets across, the packets having layers 2, 3, 4, and 7 header anomalies;

layers 2, 3, 4, and 7 state transition and state based anomalies;

layers 2, 3, 4, and 7 rate anomalies as detected by the system which is continuously and adaptively adjusting rate thresholds;

characteristics of network probes or reconnaissance as detected by certain meters;

content anomalies as defined by a set of content rules; or violate network policies as set by a system administrator.

Still further objects and advantages of the present invention will become apparent to one skilled in the art upon reading and understanding the preferred embodiments described below with reference to the following drawings.

DETAILED DESCRIPTION

The present invention provides an integrated intrusion prevention solution. A single hardware based appliance integrates a plurality of mechanisms to prevent different anomalies and enables a policy based packet filter.

Figure 1:
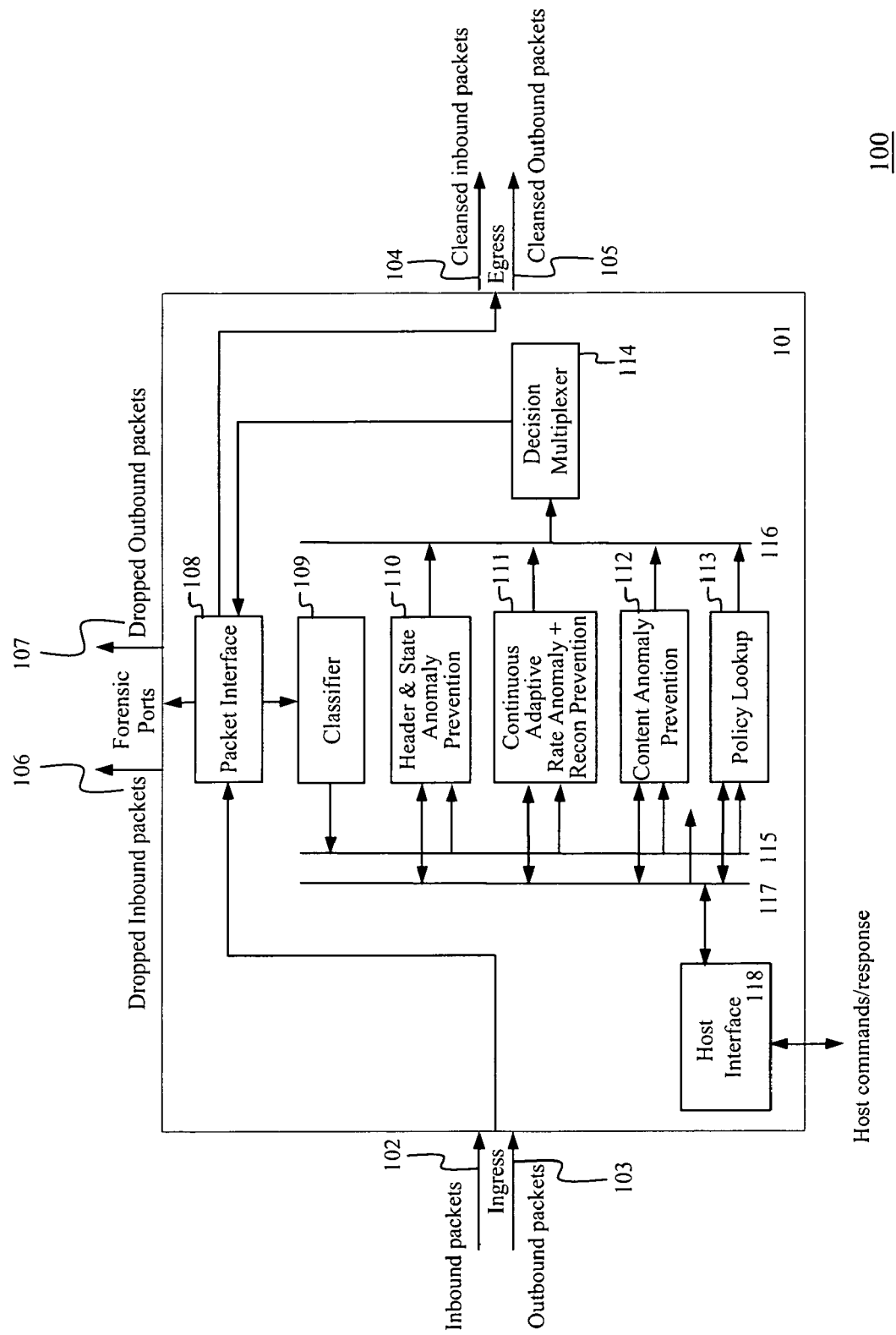
FIG. 1 illustrates an exemplary apparatus embodying the present invention.

FIG. 1 depicts an exemplary apparatus 101 illustrating the functionality of an integrated system 100 for the prevention of network attacks. The four main components are the Header and State Anomaly Prevention 110, the Continuous Adaptive Rate Anomaly and Reconnaissance Prevention 111, the Content Anomaly Prevention 112, and the Policy Lookup Engine 113.

Network inbound packets 102 enter the apparatus 101 and exit as cleansed inbound packets 104. Similarly, network outbound packets 103 enter the apparatus 101 and exit as cleansed outbound packets 105. The dropped packets make the difference between packets at ingress and at egress. For the purpose of forensic analysis, these dropped packets are routed to two forensic ports viz. the Dropped Inbound Packets 106, and the Dropped Outbound Packets 107.

Packets entering the system 100 are buffered in the Packet Interface block 108. A copy of these packets is passed to the Classifier 109 which passes on the header and other relevant information over the Classification bus 115 to the subsequent blocks for decision making. The Packet Interface block 108 receives a multiplexed decision about each packet buffered within and either allows the packets or drops the packets. The drop packets are optionally copied to the forensic ports 106 and 107.

The decision making operation of determining which packets need to be dropped is handled by the four major blocks, viz. the Header and State Anomaly Prevention 110, the Rate Anomaly and Reconnaissance Prevention 111, the Content Anomaly Prevention 112, and the Policy Lookup Engine 113. They send the results to the Decision Multiplexer 114 via the Decision bus 116.

A controlling host uses the Host Interface 118 to read the controlling parameter and set the parameters of different blocks via the Host Interface Bus 117. The controlling host also reads events related to policy violations and anomalies. In some embodiments, these events are subsequently logged and/or analyzed.

The Header Anomaly Prevention block within 110 prevents packets that have layers 2, 3, 4 and 7 header anomalies according to protocols under consideration. For example, in an exemplary embodiment of this invention, layer 3 header anomaly prevention looks for packets that are marked IPV4 packets in layer 2 header but do not have version 4 in the IP header. Similarly, besides other anomalies, layer 4 header anomaly prevention block looks for TCP packets that have illegal flag combinations such as SYN and FIN set together. In an exemplary embodiment of this invention, the layer 7 header anomaly prevention block looks for anomalous behavior such as non-HTTP traffic on port 80.

The State Anomaly Prevention block within 110 prevents packets that violate standard state transitions in protocols. In an exemplary embodiment of this invention, the layer 4 state anomaly prevention block prevents packets that do not belong to any established connection and have ACK bit on in the TCP flags. In an exemplary embodiment of this invention, the layer 7 state anomaly prevention block prevents HTTP packets that have a GET as the method, but do not have a valid URI parameter.

The Continuous and Adaptive Rate Anomaly Prevention block within 112 prevents instantaneous rate anomaly as detected through continuous and adaptive learning. In an exemplary embodiment of this invention, rate anomalies at network layers 2, 3, 4 and 7 are to be detected and prevented by this block. As an example, TCP option rate anomaly is prevented by seeing/detecting packets with a specific TCP option type exceeding their adaptively learnt threshold.

The Reconnaissance Prevention block within 112 prevents reconnaissance (recon) activities. In an exemplary embodiment of this invention, as an example, one of the recon prevention schemes is implemented utilizing a port-scan counter.

The Content Anomaly Prevention block 112 prevents packets that match known signature of attacks in the application content of the packet. In an exemplary embodiment of this invention, these rules consist of signatures in the packet anywhere or within specifically parsed areas of the packets such as HTTP URI, or other parameters. In an exemplary embodiment of this invention, necessary packet normalization for accurate content inspection may be supplemented with processing such as fragment reassembly, TCP assembly, reordering, retransmission removal, URI normalization, etc. The purpose of such normalization is to send normalized packets for content inspection.

The Policy Lookup engine 113 prevents packets that violate the network policies set by an administrator. In an exemplary embodiment of the current inventions, the policies are set by the administrator and consist of rules which allow or deny packets based on interface, source IP address, destination IP address, IPV4 or IPV6 protocol, source port, destination port, and/or ICMP type and code.

The Decision Multiplexer block 114 receives decisions from decision making blocks 110, 111, 112, and 113 over the Decision bus 116 and combines them as a single decision and forwards them to the Packet Interface block 108.

The controlling host can read the control registers and set them to manage the functionality of different components. The Host Interface block 118 accesses other blocks through the Host Interface Bus 117. The controlling host can also read the statistics related to packets being dropped due to anomalies or policy violation. The controlling host can then use this data for logging and analysis.

Figure 2:
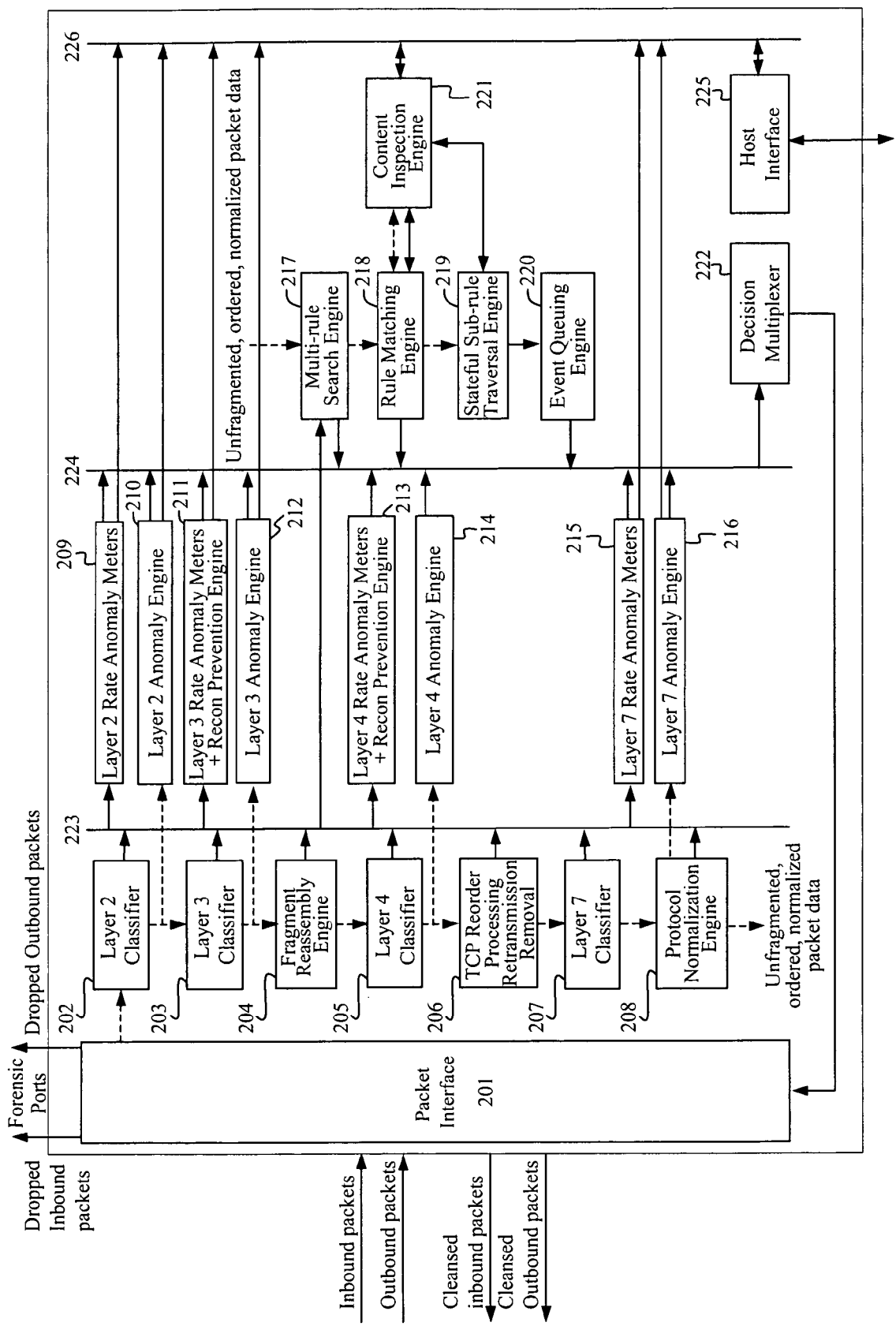
FIG. 2 schematically shows architectural details of FIG. 1, depicting some of the key components necessary to implement a system according to the present invention.

FIG. 2 illustrates further details of the system 100 from FIG. 1. Packet Interface 201 receives packets, buffers them, releases a copy of the packets to the subsequent logic, re-releases another copy of the packets held upon order from certain blocks, awaits decisions and subsequently either transmits them further or drops and/or transmits them on forensic ports.

The Classifier 109 is further illustrated in detail through the Layer 2 Classifier 202, the Layer 3 Classifier 203, the Fragment Reassembly Engine 204, the TCP Reorder Processing and Retransmission Removal Engine 205, the Layer 4 Classifier 206, the Layer 7 Classifier 207, and the Protocol Normalization Engine 208.

The Layer 2 Classifier 202 receives frames from Packet Interface 201 and classifies packets based on their layer 2 characteristics. It parses the layer 2 headers and passes that information to subsequent logic blocks over the Classification Bus 223. In an exemplary embodiment of this invention, this block can parse Ethernet frames and IEEE 802.2/3 frames and can determine ARP, RARP, Broadcast, Multicast, non-IP, VLAN tagged frames, and double encapsulated VLAN tagged frames.

The Layer 3 Classifier 203 receives packet data as well as layer 2 classifier information from the Layer 2 Classifier 202. It extracts the layer 3 header information in IPV4 and IPV6 headers and passes it on to the subsequent logic over the Classification Bus 223. In some embodiments of this invention, the Classifier parses IPV4 and IPV6 packets and determines properties such as TOS, IP Options, fragmentation, and layer 4 protocol.

The Fragment Reassembly Engine 204 receives layer 3 header information from the Layer 3 Classifier 203 as well as the packet data. In cases where the Layer 3 Classifier 203 informs that this packet is a fragmented packet, the Fragment Reassembly Engine 204 requests the Packet Interface Block 201 to hold the packet. It also informs subsequent blocks not to inspect the packet as it is not yet assembled. It stores the information about fragments in its internal data-structures related to reassembly. Packets that are not fragmented are passed through. A timeout based mechanism is then used to wait until all the fragments that belong together have been received. An ager based mechanism periodically wakes up and determines whether some fragments are over-age and discards them from memory.

Once the Fragment Reassembly Engine 204 determines that all fragments are in-order and do not violate any fragmentation related anomalies, it requests the Packet Interface Engine 201 to re-release them in-order. These packets are then passed through the subsequent blocks in order for further inspection. The Fragment Reassembly Engine 204 therefore guarantees that blocks subsequent to it always receive datagram fragments in-order.

The Fragment Reassembly Engine 204 also determines whether there are fragmentation related anomalies and, if so, marks those packets as invalid and informs the decision to the Decision Multiplexer 222 over the Decision Bus 224. The techniques necessary to achieve fragment assembly as well as fragmentation related anomaly prevention are well known to those skilled in the art and thus are not further described herein. The allowed assembled packets leave as original unmodified packets with their own packet ID, but they leave the Fragment Reassembly Engine 204 in order so that subsequent blocks can inspect the content in order.

The Layer 4 Classifier 205, similarly, parses the layer 4 information from packets that are guaranteed to be free of fragmentation. In an exemplary embodiment of this invention this classifier looks at TCP, UDP, ICMP, IPSec-ESP, and IPSec-AH headers. This information is passed to the subsequent blocks over the Classification Bus 223. In an exemplary embodiment of this invention, this classifier can parse layer 4 information such as TCP Options, TCP ports, UDP Ports, ICMP types/codes, TCP flags, sequence numbers, ACK numbers etc.

Packets that are anomalous are dropped.

The TCP Reordering Processing and Retransmission Removal Engine 206 receives classified packets from the Layer 4 Classifier 205. It only monitors TCP packets and it passes the rest further to subsequent blocks for further inspections. It creates connection states in memory tables and ensures that packets follow well-known TCP state transitions. Packets that are anomalous are dropped through a decision sent over the Decision Bus 224 to the Decision Multiplexer 222. In a preferred embodiment of this invention, this block further checks whether the packet's TCP sequence number is in order and within the receiver's window. Packets that are outside the window are dropped through the Decision Multiplexer 222. Packets that are in-order and not retransmissions are passed through.

For all packets within the window that have not been acknowledged yet, a CRC based checksum is saved as part of the state for the connection. It requests subsequent blocks not to inspect the packets which are out of order. It holds data structure related to such packets in memory. For every such packet stored in memory, a self-generated ACK is sent to the sender to facilitate quicker reordering. A timeout based mechanism is then used to wait until expected sequence number arrives for the connection. An ager based mechanism periodically wakes up and determines whether some packets are over-age and discards them from memory. The ordered packets are then passed through the subsequent blocks in order for further inspection. This way, the subsequent blocks can always assume that TCP packets will always be in-order.

The engine 206 also determines whether there are retransmission related anomalies and, if so, marks those packets as invalid and informs the decision to the Decision Multiplexer 222 over the Decision Bus 224. Retransmission anomalies are determined using the CRC based checksum stored. Retransmitted packets that are equal or larger than the previous transmission can be determined to be anomalous through a CRC comparison. Retransmissions that are smaller than earlier transmission are discarded. The techniques necessary to achieve TCP reordering as well as retransmission related anomaly prevention are well known to those skilled in the art and thus are not further described herein. The allowed ordered packets leave as original unmodified packets with their own packet ID, but they leave the engine 206 in order so that subsequent blocks can inspect the content in order.

The Layer 7 Classifier 207 receives un-fragmented IP, ordered TCP and other packets, and parses layer 7 header information. In an exemplary embodiment of this invention, this block parses headers of protocols such as FTP, HTTP, TELNET, DNS, SMTP, POP, RPC, etc. It does so using stateful parsing techniques well-known to those aware of the art.

In an embodiment of this invention, the FTP classifier within 207 determines the commands and replies being used in the FTP packets. Commands parsed include USER,PASS, ACCT, CWD, CDUP, SMNT, REIN, QUIT, PORT, PASV, TYPE, STRU, MODE, RETR, STOR, STOU, APPE, ALLO, REST, RNFR, RNTO, ABOR, DELE, RMD, MKD, PWD, LIST, NLST, SITE, SYST, STAT, HELP, NOOP. 3-digit reply codes are parsed as well and grouped as positive and negative.

In an embodiment of this invention, the HTTP classifier within 207 determines the requests and replies being used in the HTTP packets. Requests are parsed as Method, Request-URI, Request-Header Fields, and HTTP-Version. The Method is further classified as OPTIONS, GET, HEAD, POST, PUT, DELETE, TRACE, CONNECT, and extension methods. The request URI is isolated and passed further. Request-Header Fields such as Accept-Charset, Accept-Encoding, Accept-Language, Authorization, Expect, From, Host, If-Match, If-Modified-Since, If-None-Match, If-Range, If-Unmodified-Since, Max-Forwards, Proxy-Authorization, Range, Referer, TE, User-Agent. 3-digit status codes are parsed as well and grouped as positive and negative.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the DNS classifier within 207 parses the DNS queries. The parser breaks the DNS message into Header, Question, Answer, Authority, and Additional sections. The header is further parsed to determine whether the message is a query, response or some other code. The Question section is further parsed as QNAME, QTYPE and QCLASS. The Answer section is further classified as resource record (RR) consisting of Domain Name, Type, Class, TTL, and Resource data length.

In an embodiment of this invention, the SMTP classifier within 207 parses the SMTP commands and replies. The commands are further parsed as EHLO, HELO, MAIL, RCPT, DATA, RSET, VRFY, EXPN, HELP, NOOP, and QUIT. Replies are further decoded as positive and negative.

In an embodiment of this invention, the POP classifier within 207 parses the POP commands and responses. The commands are further parsed as USER, PASS, APOP, QUIT, STAT, LIST, RETR, DELE, NOOP, RSET, TOP, UIDL, and QUIT. Responses are further decoded as positive and negative.

In an embodiment of this invention, the RPC classifier within 207 parses the RPC message. The message is parsed as transaction id, followed by the call or reply. The call is further parsed as RPC version, program number, version number, procedure and the rest of the call body. The reply is further parsed as accepted or denied.

Protocol Normalization Engine 208 receives classified packets and normalizes the parsed data so that it can be inspected for content anomalies. In a preferred embodiment of the invention, the normalization is done for URI portion of the within HTTP. The normalizations include Hex-encoding, Double Percent Hex-encoding, Double Nibble Hex Encoding, First Nibble Hex Encoding, Second Nibble Hex Encoding, UTF-8 Encoding, UTF-8 Bare Byte Encoding, Unicode, Microsoft % U encoding, Alt-Unicode, Double encode, IIS Flip Slash, White-space, etc. In a preferred embodiment of this invention the normalization is done for RPC records by consolidating records broken into more than one record fragment into a single record fragment. In a preferred embodiment of this invention, the TELNET protocol normalization removes negotiation sequences. This normalization prunes negotiation code by copying all non-negotiation data from the packet. In a preferred embodiment of this invention, the TELNET normalization is also performed on the FTP packets.

The Continuous and Adaptive Rate Anomaly block within 111 is further illustrated in the Layer 2 Rate Anomaly Meters 209, the Layer 3 Rate Anomaly Meters 211, the Layer 4 Rate Anomaly Meters 213, and the Layer 7 Rate Anomaly Meters 215. The meters 209, 211, and 213 continuously and adaptively determine rate thresholds for layers 2, 3 and 4 network parameters and determine whether flood is occurring for any of the parameters. A controlling host uses the Host Interface 225 to learn the rate and set the threshold. All the meters support a two way communication with the host through the Host Interface Bus 226. The above referenced co-pending U.S. patent application No. 10/759,799, now U.S. Pat. No. 7,426,634, entitled "METHOD AND APPARATUS FOR RATE BASED DENIAL OF SERVICE ATTACK DETECTION AND PREVENTION," discusses in detail how rate based denial of service attacks can be prevented using a continuous and adaptive learning approach for layers 2, 3 and 4 based attacks.

The Layer 7 Rate Anomaly Meters 215 continuously and adaptively determine rate thresholds for layer 7 network parameters and determine whether flood is occurring for any of the parameters. In an exemplary embodiment of this invention, the apparatus 101 can detect and prevent following application layer floods:

HTTP Request Type Floods,
HTTP Failure Floods,
FTP Request Floods, and
FTP Failure Floods.

According to the invention, a HTTP Request Rate Anomaly Meter prevents different request methods such as GET, PUT, POST etc. from being used more often than the previously observed threshold. A HTTP Failure Floods Meter prevents http failure floods where a single source continuously fails in getting an HTTP request serviced through HTTP negative reply status code above 400. A FTP Request Rate Anomaly Meter prevents different request methods such as RETR, STOR, USER, PORT, ABOR, etc. from being used more often than the previously observed threshold. A FTP Failure Floods prevents FTP failure floods where a single source continuously having negative replies above code 400. The Host Interface Bus 226 is used to inform the controlling host, via the Host Interface 225, of the continuous rates being learnt so that the controlling host can adaptively set the thresholds for layer 7 Rate Anomaly Meters 215.

The Recon Prevention sub-block within 111 is further illustrated in the Layer 3 Recon Prevention sub-block within 211 and the Layer 4 Recon Prevention sub-block within 213. The Layer 3 Recon Prevention sub-block within 211 prevents reconnaissance activity at layer 3. In an exemplary embodiment of this invention, this block prevents IP-address scanning, using information received from the layer 3 classifier and determines whether a single source is connecting to many IP addresses within a short interval. In another embodiment of this invention, this block prevents dark-address scanning, using information received from the layer 3 classifier and determines whether a source is scanning unused IP address ranges.

The Layer 4 Recon Prevention sub-block within 213 prevents reconnaissance activity at layer 4. In an exemplary embodiment of this invention, this block prevents port-scanning, using information received from the layer 3 and layer 4 classifiers and determines whether a single source is connecting to many layer 4 TCP/UDP ports within a short interval.

The Header and State Anomaly Prevention block within 110 is further illustrated in the Layer 2 Anomaly Engine 210, the Layer 3 Anomaly Engine 212, the Layer 4 Anomaly Engine 214, and the Layer 7 Anomaly Engine 216. The Engines 210, 212, 214 and 216 receive corresponding classifier outputs over the Classification Bus 223 and determine whether the header has any anomaly or whether the state transition due to header values leads to anomalies. The packets determined to be anomalous are dropped via a decision sent over the Decision Bus 224 to the Decision Multiplexer 222.

In some embodiments, the Layer 3 Anomaly Engine 212 detects and prevents IPV4 packets that have one or more of the following anomalies:
 invalid IP header checksum,
 version other than 4,
 source or destination equivalent to local host,
 same source and destination,
 end of packet before 20 bytes,
 end of packets before the length specified by total length,
 end of packet while parsing options,
 option length less than 3,
 time to live is 0,
 protocol corresponding to ipv6, etc.

In some embodiments, the Layer 3 Anomaly Engine 212 detects and prevents IPV6 packets that have one or more of the following anomalies:
 version other than 6,
 source or destination equivalent to local host,
 same source and destination,
 end of packet before the header,
 end of packet in the middle of the headers,
 end of packet while parsing options,
 same extension header occurring more than once,
 hop-limit of 0,
 Protocol corresponding to ipv4, etc.

In some embodiments, the Layer 3 Anomaly Engine 212 also prevents fragmented packets that have over assembly related anomalies as detected by Fragment Assembly Engine 204.

In some embodiments, the Layer 4 Anomaly Engine 214, detects and prevents TCP packets that have one or more of the following anomalies:
 data offset less than 5,
 TCP checksum error,
 illegal TCP flag combinations,
 urgent flag set, but urgent pointer is zero,
 end of packet before 20 bytes of TCP header,
 length field in window scale option is other than 3,
 TCP Option length is less than 2, etc.

In some embodiments, the Layer 4 State Anomaly Engine 214, detects and prevents UDP packets that have one or more of the following anomalies:
 optional UDP checksum error,
 end of packet before 8 bytes of UDP header, etc.

In some embodiments, the Layer 4 State Anomaly Engine 214 detects and prevents TCP packets that violate valid state transitions that are expected by standard TCP state machines. For this purpose, it receives information from the Layer 4 Classifier 205 and the TCP Reorder Processing and Retransmission Removal Engine 206. Packets that are outside the receiver's window as maintained by the state table are also dropped for being anomalous. Retransmitted packets that are determined by the Retransmission Removal engine 206 to be different from the original transmission are also dropped by the Layer 4 State Anomaly Engine 214.

In some embodiments, the Layer 7 Anomaly Engine 216 prevents state transition anomalies at layer 7 protocols such as HTTP, e.g., the GET keyword for request method must be followed by a URI. Similarly, the FTP protocol Anomaly Engine within 216 can identify requests that are within the allowed requests as defined in the RFC.

The Content Anomaly Prevention block 112 is further illustrated via its sub-components Multi-Rule Search Engine 217, Rule Matching Engine 218, Stateful Sub-rule Traversal Engine 219, Event Queuing Engine 220, and Content Inspection Engine 221. The Multi-rule Search Engine 217 gets classification information from the Classification Bus 223. Part of this information, viz. Interface, Source IP Address, Destination IP Address, Protocol, Source Port, and Destination Port, is used to first search through a search engine to determine whether the packet violates any policies. If so, the packet is dropped through a decision conveyed over the Decision Bus 224 to the Decision Multiplexer 222.

If the search matches certain rules and requires further content inspection, the Rule Matching Engine 218 sends the assembled, ordered, normalized data to the Content Inspection Engine 221. An external host loads the contents of the BRAM, SRAM, and DRAM of the Content Inspection Engine 221 with necessary signatures corresponding to the rule-sets through the Host Interface 225 over the Host Interface Bus 226.

The Content Inspection Engine 221 can start the initial state at a specific point where the last match for the previous packet had occurred. This helps in statefully matching the strings across packets.

Once the Rule Matching Engine 218 determines, via the Content Inspection Engine 221, that the packet matches at least one of the signatures, it needs to statefully walk through all the optional sub-signatures within the rule. The statefulness is required because the signatures may be split across fragmented packets or reordered packets. For this purpose, the state of the last match where it was left is kept in the memory for the specific connection.

Once all signatures are found to be present in the packet, the rule is said to be matched. Such a match is denoted as an event. This event is queued against the packet's ID in the Event Queuing Engine 220.

A packet may match multiple such events. A priority scheme within the Event Queuing Engine 220 picks the highest priority event from the determined events for the packet and informs the corresponding decision to the Decision Multiplexer 222 over the Decision Bus 224.

Blocks such as 209, 210, 211, 212, 213, 214, 215, 216, 217, 218, and 220 inform of their decision, whether to drop the packet or not, to the Decision Multiplexer 222.

Figure 3:
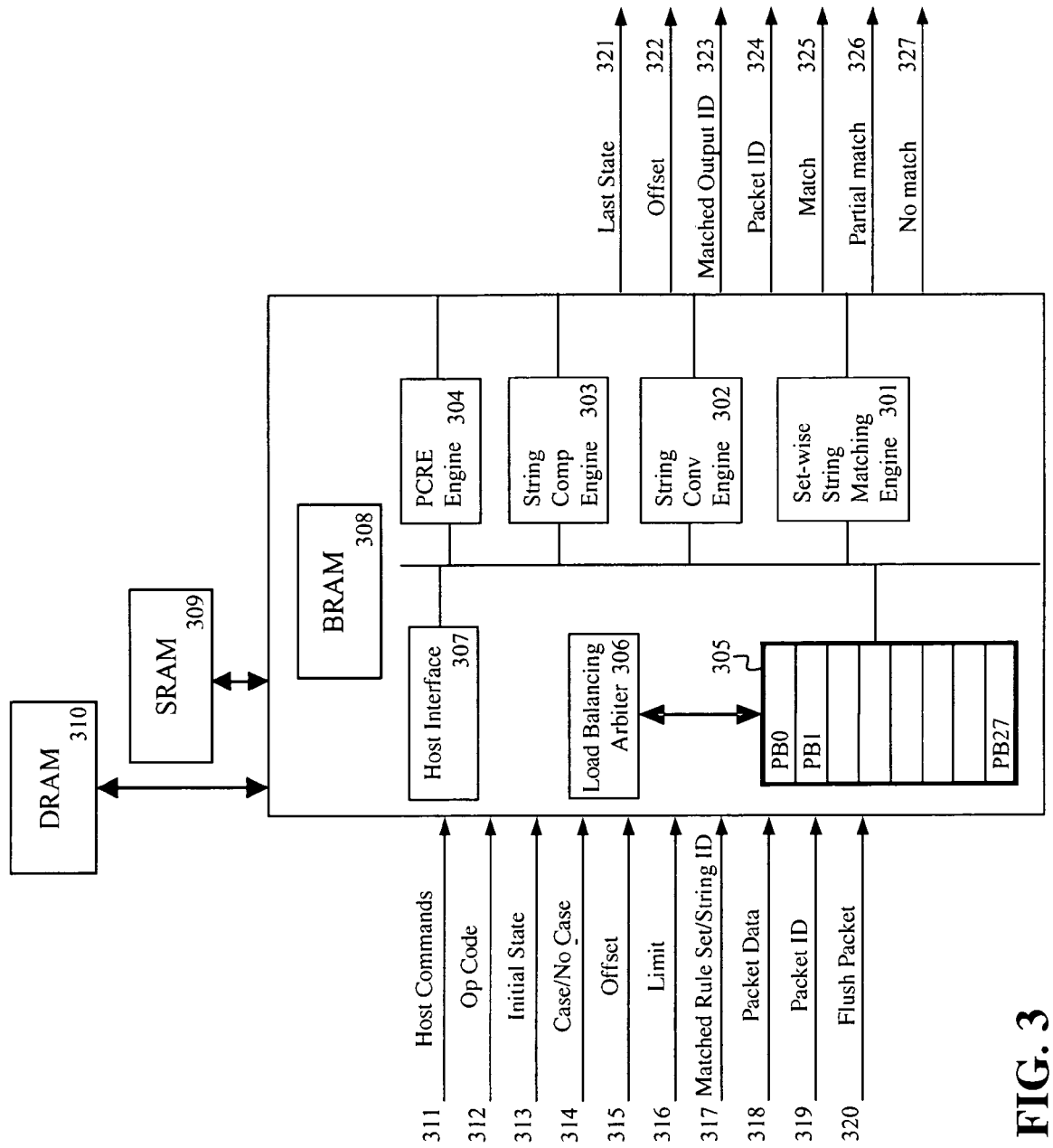
FIG. 3 illustrates further details of the Content Inspection Engine of FIG. 2.

FIG. 3 illustrates further details of the Content Inspection Engine block 221 from FIG. 2. In an exemplary embodiment of this invention, the Content Inspection Engine 221 contains 4 types of content inspection blocks. These are Set-wise String Matching Engine 301, String Conversion Engine 302, String Comparison Engine 303, and Perl Compatible Regular Expression Engine 304. Together these four engines provide the necessary stateful content inspection capability.

The Packet Buffers 305 (PB0 through PB27) allow incoming packets to be buffered until all processing has been done on them. Once a packet buffer is filled and available for processing, the Load Balancing Arbiter assigns 306 the buffer to an available processing engine out of the available pool from 301, 302, 303 and 304, depending on the type of requested operation. This is done in a way to optimize the resources. The packet data arrives from the preceding blocks via the Packet Data signal 318 with a corresponding Packet ID 319. The preceding block can flush the packet using the Flush Packet signal 320 and the corresponding Packet ID 319, after all the processing has been completed on the packet.

The Operation Code on the packet buffer is identified using Op Code signal 312. This can be one of the four corresponding to the four engines. Other parameters such as Initial State 313, Case-no-case 314, Offset 315, Limit 316, and Matching Rule-set/String ID 317, are provided to the engines through the input interface.

The engines provide (output) the following parameters: Last State 321, Offset 322, Matched Output ID 323, corresponding Packet ID 324, match 325, no match 326, and partial match 327. These are used by the preceding blocks, i.e., the Rule Matching Engine 218, and the Stateful Sub-rule Traversal Engine 219.

The engines use the RAM 308, the SRAM 309, and the DRAM 310 per their needs for storage of states, strings, outputs, and any other relevant data structures. These memory areas are initialized through the Host Interface 307 by the controlling host using the Host Commands 311. The host can also read statistics related to matches and errors using 307 and 311.

For set-wise string matching at high rate, the set-wise rule matching engine 301 advantageously utilizes the innovative layered memory architecture, system, and method disclosed in the above-referenced co-pending U.S. patent application No. 10/984,244, now U.S. Pat. 7,356,663, entitled "LAYERED MEMORY ARCHITECTURE FOR DETERMINISTIC FINITE AUTOMATON BASED STRING MATCHING USEFUL IN NETWORK INTRUSION DETECTION AND PREVENTION SYSTEMS AND APPARATUSES."

The String Conversion Engine 302 allows the strings in various formats such as hexadecimal, decimal, octal, binary to be converted to numbers.

The String Comparison Engine 303 compares incoming packet's sub-strings with signature-strings stored in DRAM at given offsets and within limits.

The PCRE Engine 304 matches Perl Compatible Regular Expressions with incoming packet's sub-strings with a given Perl-Compatible Regular Expression automata stored in DRAM at given offsets and within limits.

Figure 4:
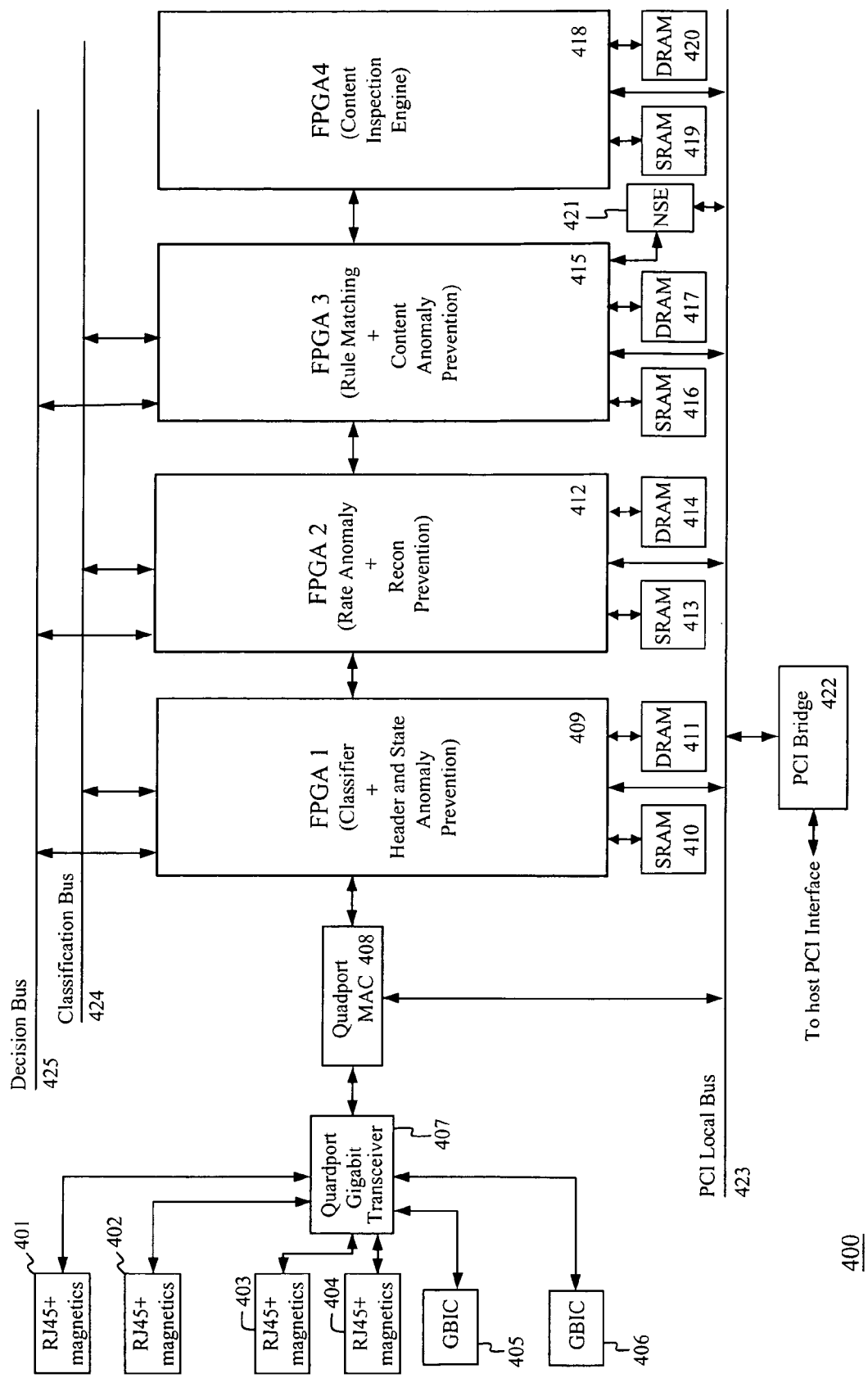
FIG. 4 illustrates an exemplary apparatus embodying exemplary hardware components implementing the architecture of FIG. 2.

FIG. 4 illustrates an exemplary apparatus embodying exemplary hardware components according to an implementation of the architecture of FIG. 2. In the example shown in FIG. 4, a Quad-port system 400 is implemented wherein two ports are ingress and egress of data while the other two ports are for forensic purpose. The two ingress and egress data ports can be implemented using either copper or fiber interface. Copper interfaces are shown as RJ45 interfaces 403 and 404. Fiber interfaces are shown as GBICs 405 and 406. The forensic ports are shown as 401, and 402.

A Quad-port 10/100/1000 Mbps transceiver 407 interfaces with the copper or fiber interfaces and passes the signals further to a Quad-port MAC 408. The subsequent blocks described above with reference to FIG. 2 are implemented using four FPGAs 409, 412, 415 and 418. Each of these FPGAs has a provision of buffering packets and other relevant information using SRAM 410, 413, 416, and 419, and DRAM 411, 414, 417, and 420. The third FPGA 415 uses a high speed Network Search Engine 421 to search through a set of rules stored therein. This is also used as a policy lookup engine.

In some embodiments, the host interface is implemented using a PCI Host Bridge 422. The host can control the logic blocks in different FPGAs, the NSE and the Quad-port MAC, via the PCI Local Bus 423. The FPGAs communicate classification information over the Classification Bus 424 and the decisions over Decision Bus 425. The controlling host can access the statistics related to events of dropping the packets due to anomalies or policy violations through the same PCI interface and use that information to log the events for further analysis.

Although the present invention and its advantages have been described in detail, it should be understood that the present invention is not limited to or defined by what is shown or discussed herein. For example, the logic in the four FPGAs 409, 412, 415 and 418 may be combined in a custom silicon ASIC while providing the same functionality.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

I claim:

1. An apparatus for enforcing network policies and preventing attacks related to header, state, rate and content anomalies, said apparatus comprising:
   a) a Packet Interface programmed for
      receiving inbound/outbound packets,
      storing the packets in a memory buffer,
      releasing the packet with a packet-id to subsequent blocks for inspection,
      dropping the packets altogether, and
      sending the packets onto forensic ports based on a unified decision;
   b) a Classifier coupled to the Packet Interface and programmed for classifying packets received from the Packet Interface, and retrieving layer 2, layer 3, layer 4, and layer 7 header information from the packets;
   c) a Header and State Anomaly Prevention Engine coupled to the Classifier via a classification bus and programmed for determining layers 2, 3, 4, and 7 header and state anomalies;
   d) a Continuous and Adaptive Rate Anomaly Prevention Engine coupled to the classification bus and programmed for determining and estimating rate thresholds for layers 2, 3, 4, and 7 parameters and subsequently determining rate anomalies for these parameters;
   e) a Recon Prevention Engine coupled to the classification bus and programmed for determining recon activities at layers 3 and 4;
   f) a Content Anomaly Engine coupled to the classification bus and programmed for determining known attacks using signatures;
   g) a Policy Lookup Engine coupled to the classification bus and programmed for determining policy violation in packets; and
   h) a Decision Multiplexer for generating the unified decision about a packet-id based on information received from a plurality of sources including the Header and State Anomaly Prevention Engine, the Continuous and Adaptive Rate Anomaly Prevention Engine, the Recon Prevention Engine, the Content Anomaly Engine, and the Policy Lookup Engine;
   wherein the Classifier further comprises:
   layers 2, 3, 4, and 7 classifiers;
   a Fragment Reassembly Engine for assembling the packets;
   a Transmission Control Protocol (TCP) Reorder Processing and Retransmission Removal Engine for ordering the assembled packets; and
   a Protocol Normalization Engine for normalizing the ordered packets;
   wherein the Fragment Reassembly Engine performs fragment reassembly to accurately classify packets at layer 4;
   and wherein the Fragment Reassembly Engine provides statistics for rate anomalies for fragmented packets and header anomalies for packets with fragmentation related anomalies.

2. The apparatus of claim 1, further comprising:
a host interface for setting necessary data structures in memory of logic blocks through host commands.

3. The apparatus of claim 1, further comprising:
copper interfaces, fiber interfaces, or a combination of both, through which the Packet Interface receives the inbound/outbound packets.

4. The apparatus of claim 1, wherein
the TCP Reorder Processing and Retransmission Removal Engine performs TCP reordering and retransmission removal at layer 4 to accurately classify fragment-assembled packets for content inspection at layer 7; and wherein
the TCP Reorder Processing and Retransmission Removal Engine operates to isolate packets with retransmission anomalies.

5. The apparatus of claim 4, wherein
the Protocol Normalization Engine performs protocol normalization on the assembled and ordered packets to accurately classify these packets for content inspection at layer 7; and wherein the Protocol Normalization Engine operates to isolate packets with content anomalies.

6. The apparatus of claim 1, further comprising:
a Multi-rule Search Engine for isolating a rule-set that matches a given packet among a set of rules based on the given packet's network parameters identified by the layer 2, 3, 4 and 7 classifiers;

a Rule Matching Engine for validating each rule from the rule-set identified by Multi-rule Search Engine;

a Content Inspection Engine for providing necessary stateful content inspection;

a Stateful Sub-rule Traversal Engine operating along with the Rule Matching Engine and the Content Inspection Engine to statefully parse signatures across the packets and validate packets that match all signatures; and an Event Queuing Engine for the Rule Matching Engine to deposit events related to content matches, the Event Queuing Engine later combines and prioritizes all events for a given packet and outputs a corresponding decision to the Decision Multiplexer.

7. The apparatus of claim 1, further comprising:

a Layer 2 Rate Anomaly Meter for detecting and preventing Layer 2 rate anomalies in layer 2 parameters;

a Layer 3 Rate Anomaly Meter for detecting and preventing Layer 3 rate anomalies in layer 3 parameters;

a Layer 4 Rate Anomaly Meter for detecting and preventing Layer 4 rate anomalies in layer 4 parameters; and a Layer 7 Rate Anomaly Meter for detecting and preventing Layer 7 rate anomalies in layer 7 parameters.

8. The apparatus of claim 7, wherein layer 2 parameters include Address Resource Protocol (ARP), Reverse ARP (RARP), Broadcast, Multicast, Non-Internet Protocol (IP), Virtual Local Area Network (VLAN), and Double Encapsulated VLAN;

layer 3 parameters include Source, Destination, Type of Service (TOS), IP Options, Fragmented Packets, and Protocols;

layer 4 parameters include TCP Ports, User Datagram Protocol (UDP) Ports, Internet Control Message Protocol (ICMP) Type/Codes, synchronization (SYN) packets, and Connection Rates; and layer 7 parameters include Hyper-Text Transfer Protocol (http) Requests, HTTP Replies, File Transfer Protocol (FTP) Requests, FTP Replies, TELNET commands and replies, Domain Name Service (DNS) queries and replies, Simple Mail Transfer Protocol (SMTP) commands and replies, Postal Office Protocol (POP) commands and replies, and Remote Procedure Call (RPC) methods and replies.

9. An apparatus for enforcing network policies and preventing attacks related to header, state, rate and content anomalies, said apparatus comprising:

a) a Packet Interface programmed for
   receiving inbound/outbound packets,
   storing the packets in a memory buffer,
   releasing the packet with a packet-id to subsequent blocks for inspection,
   dropping the packets altogether, and
   sending the packets onto forensic ports based on a unified decision;

b) a Classifier coupled to the Packet Interface and programmed for classifying packets received from the Packet Interface, and retrieving layer 2, layer 3, layer 4, and layer 7 header information from the packets;

c) a Header and State Anomaly Prevention Engine coupled to the Classifier via a classification bus and programmed for determining layers 2, 3, 4, and 7 header and state anomalies;

d) a Continuous and Adaptive Rate Anomaly Prevention Engine coupled to the classification bus and programmed for determining and estimating rate thresholds for layers 2, 3, 4, and 7 parameters and subsequently determining rate anomalies for these parameters;

e) a Recon Prevention Engine coupled to the classification bus and programmed for determining recon activities at layers 3 and 4;

f) a Content Anomaly Engine coupled to the classification bus and programmed for determining known attacks using signatures;

g) a Policy Lookup Engine coupled to the classification bus and programmed for determining policy violation in packets; and h) a Decision Multiplexer for generating the unified decision about a packet-id based on information received from a plurality of sources including the Header and State Anomaly Prevention Engine, the Continuous and Adaptive Rate Anomaly Prevention Engine, the Recon Prevention Engine, the Content Anomaly Engine, and the Policy Lookup Engine;

wherein the Classifier further comprises:

layers 2, 3, 4, and 7 classifiers;

a Fragment Reassembly Engine for assembling the packets;

a Transmission Control Protocol (TCP) Reorder Processing and Retransmission Removal Engine for ordering the assembled packets; and a Protocol Normalization Engine for normalizing the ordered packets;

wherein the apparatus further comprises:

a Multi-rule Search Engine for isolating a rule-set that matches a given packet among a set of rules based on the given packet's network parameters identified by the layer 2, 3, 4 and 7 classifiers;

a Rule Matching Engine for validating each rule from the rule-set identified by Multi-rule Search Engine;

a Content Inspection Engine for providing necessary stateful content inspection;

a Stateful Sub-rule Traversal Engine operating along with the Rule Matching Engine and the Content Inspection Engine to statefully parse signatures across the packets and validate packets that match all signatures; and an Event Queuing Engine for the Rule Matching Engine to deposit events related to content matches, the Event Queuing Engine later combines and prioritizes all events for a given packet and outputs a corresponding decision to the Decision Multiplexer;

wherein the Content Inspection Engine further comprises:

a first engine for matching an incoming string against a set of strings in a single pass;

a second engine for matching the incoming single string with the packet's substrings;

a third engine for converting the packet's substrings into numbers usable as offsets or limits; and a fourth engine for comparing the packet's substrings.

10. A system for enforcing network policies and preventing attacks related to header, state, rate and content anomalies, said system comprising:

a controlling host;

an apparatus coupled to the controlling host, comprising:

a) a Packet Interface for
   receiving inbound/outbound packets,
   storing the packets in a memory buffer,
   releasing the packet with a packet-id to subsequent blocks for inspection,
   dropping the packets altogether, and
   sending the packets onto forensic ports based on a unified decision;

b) a Classifier coupled to the Packet Interface and programmed for classifying packets received from the Packet Interface, and retrieving layer 2, layer 3, layer 4, and layer 7 header information from the packets;

c) a Header and State Anomaly Prevention Engine coupled to the Classifier via a classification bus and programmed for determining layers 2, 3, 4, and 7 header and state anomalies;

d) a Continuous and Adaptive Rate Anomaly Prevention Engine coupled to the classification bus and programmed for determining and estimating rate thresholds for layers 2, 3, 4, and 7 parameters and subsequently determining rate anomalies for these parameters;

e) a Recon Prevention Engine coupled to the classification bus and programmed for determining recon activities at layers 3 and 4;

f) a Content Anomaly Engine coupled to the classification bus and programmed for determining known attacks using signatures;

g) a Policy Lookup Engine coupled to the classification bus and programmed for determining policy violation in packets; and h) a Decision Multiplexer for generating the unified decision about a packet-id based on information received from a plurality of sources including the Header and State Anomaly Prevention Engine, the Continuous and Adaptive Rate Anomaly Prevention Engine, the Recon Prevention Engine, the Content Anomaly Engine, and the Policy Lookup Engine; and i) a host interface for setting necessary data structures in memory of logic blocks through host commands;

wherein the Classifier further comprises:

layers 2,3, 4, and 7 classifiers;

a Fragment Reassembly Engine for assembling the packets and providing statistics for rate anomalies for fragmented packets and header anomalies for packets with fragmentation related anomalies;

a TCP Reorder Processing and Retransmission Removal Engine for ordering the packets and isolating packets with retransmission anomalies; and a Protocol Normalization Engine for normalizing the packets and isolating packets with content anomalies;

wherein the system further comprises:

a Multi-rule Search Engine for isolating a rule-set that matches a given packet among a set of rules based on the given packet's network parameters identified by the layer 2, 3, 4 and 7 classifiers;

a Rule Matching Engine for validating each rule from the rule-set identified by Multi-rule Search Engine;

a Content Inspection Engine for providing necessary stateful content inspection;

a Stateful Sub-rule Traversal Engine operating along with the Rule Matching Engine and the Content Inspection Engine to statefully parse signatures across the packets and validate packets that match all signatures; and an Event Queuing Engine for the Rule Matching Engine to deposit events related to content matches, the Event Queuing Engine later combines and prioritizes all events for a given packet and outputs a corresponding decision to the Decision Multiplexer;

wherein the Content Inspection Engine further comprises:

a first engine for matching an incoming string against a set of strings in a single pass based on a Deterministic Finite Automaton in a memory efficient manner;

a second engine for matching the incoming single string with the packet's substrings;

a third engine for converting the packet's substrings into numbers usable as offsets or limits; and a fourth engine for comparing the packet's substrings using stored Perl Compatible Regular Expression automata.

11. The system of claim 10, further comprising:

a Layer 2 Rate Anomaly Meter for detecting and preventing Layer 2 rate anomalies in layer 2 parameters; wherein layer 2 parameters include ARP, RARP, Broadcast, Multicast, Non-IP, VLAN, and Double Encapsulated VLAN;

a Layer 3 Rate Anomaly Meter for detecting and preventing Layer 3 rate anomalies in layer 3 parameters; wherein layer 3 parameters include Source, Destination, TOS, IP Options, Fragmented Packets, and Protocols;

a Layer 4 Rate Anomaly Meter for detecting and preventing Layer 4 rate anomalies in layer 4 parameters; wherein layer 4 parameters include TCP Ports, UDP Ports, ICMP Type/Codes, SYN packets, and Connection Rates; and a Layer 7 Rate Anomaly Meter for detecting and preventing Layer 7 rate anomalies in layer 7 parameters; wherein layer 7 parameters include HTTP Requests, HTTP Replies, FTP Requests, FTP Replies, TELNET commands and replies, DNS queries and replies, SMTP commands and replies, POP commands and replies, and RPC methods and replies.

12. The system of claim 10, wherein the controlling host is programmed for reading the maximum packet rates at a regular interval for network parameters at layers 2, 3, 4 and 7 and of using those rates to populate the rate thresholds for those network parameters, thereby enabling the apparatus to determine and prevent rate anomalies.

13. The system of claim 10, wherein the controlling host is programmed for populating state transition tables, output tables and data structures in DRAM, SRAM and BRAM via host commands.

14. The system of claim 10, wherein the controlling host is programmed for populating policies for network access, rate anomalies, state anomalies, header anomalies, retrieving information on events related to packets that violate the populated policies; and logging policy violation events for analysis.

15. The system of claim 10, further comprising:

a set of copper and fiber line interfaces;

a quad-port gigabit transceiver coupled to the line interfaces, the transceiver allowing 10, 100 and 1000 Mbps full-duplex operation;

a quad-port Media Access Controller coupled to the transceiver;

a set of Field Programmable Gate Arrays or a single chip implementing the Classifier, the Header and State Anomaly Prevention Engine, the Continuous and Adaptive Rate Anomaly Prevention Engine, the Recon Prevention Engine, the Content Anomaly Engine, the Rule Matching Engine, and the Content Inspection Engine;

a Network Search Engine implementing the Policy Lookup Engine and performing rule matching operations; and a Peripheral Component Interconnect bridge implementing the host interface.

* * * * *